(12) United States Patent
Hu

(10) Patent No.: US 11,373,430 B2
(45) Date of Patent: Jun. 28, 2022

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventor: Li Hu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 226 days.

(21) Appl. No.: 16/632,126

(22) PCT Filed: Oct. 18, 2019

(86) PCT No.: PCT/CN2019/111990
§ 371 (c)(1),
(2) Date: Jan. 17, 2020

(87) PCT Pub. No.: WO2021/012428
PCT Pub. Date: Jan. 28, 2021

(65) Prior Publication Data
US 2021/0406503 A1 Dec. 30, 2021

(30) Foreign Application Priority Data
Jul. 23, 2019 (CN) .......................... 201910665346.6

(51) Int. Cl.
*G06F 3/041* (2006.01)
*G06F 3/045* (2006.01)
(Continued)

(52) U.S. Cl.
CPC ...... *G06V 40/1318* (2022.01); *G02F 1/13338* (2013.01); *G02F 1/133512* (2013.01);
(Continued)

(58) Field of Classification Search
CPC .......................... G06F 3/0412; G06K 9/0004
See application file for complete search history.

(56) References Cited

U.S. PATENT DOCUMENTS 7,663,380 B2    2/2010   Chuang et al.
2017/0351364 A1*  12/2017  Kim ...................... G06F 3/0412
(Continued)

FOREIGN PATENT DOCUMENTS

CN    101364155 A    2/2009
CN    105678255 A    6/2016
(Continued)

*Primary Examiner* — Nan-Ying Yang

(57) ABSTRACT

A display panel and a display device are provided, and a technical field in displays is related. The display panel includes an array substrate, a liquid crystal layer, a color filter layer, a sensor layer, a glass substrate, and a collimator mechanism. The sensor layer includes a plurality of fingerprint recognition units. The collimator mechanism is disposed on a side of the sensor layer away from the color filter layer. The display device includes the display panel. Display function, touch function, and fingerprint recognition function are integrated into one, by manufacturing the fingerprint recognition units on the glass substrate on the display panel. The cost and the module thickness are further optimized. A fingerprint recognition area is realized as a full-screen area, and fingerprints can be recognized at any position on the screen.

6 Claims, 3 Drawing Sheets

(51) Int. Cl.
*G06V 40/13* (2022.01)
*G02F 1/1333* (2006.01)
*G02F 1/1335* (2006.01)

(52) U.S. Cl.
CPC .. *G02F 1/133514* (2013.01); *G02F 1/133528* (2013.01); *G06F 3/0412* (2013.01)

(56) References Cited

U.S. PATENT DOCUMENTS

| | | |
|---|---|---|
| 2018/0005007 A1 | 1/2018 | Du et al. |
| 2018/0025205 A1* | 1/2018 | Wu .................. G02B 6/06 382/127 |
| 2018/0211085 A1 | 7/2018 | Liu et al. |
| 2018/0307088 A1 | 10/2018 | Liu et al. |
| 2019/0056613 A1 | 2/2019 | Wang et al. |
| 2019/0220121 A1* | 7/2019 | Kim .................. G06K 9/00087 |
| 2020/0349334 A1* | 11/2020 | Li .................. G02F 1/133512 |

FOREIGN PATENT DOCUMENTS

| | | |
|---|---|---|
| CN | 106055162 A | 10/2016 |
| CN | 106773219 A | 5/2017 |
| CN | 206179868 U | 5/2017 |
| CN | 106940488 A | 7/2017 |
| CN | 206401320 U | 8/2017 |
| CN | 107133613 A | 9/2017 |
| CN | 108415188 A | 8/2018 |

\* cited by examiner

DISPLAY PANEL AND DISPLAY DEVICE

FIELD OF INVENTION

The present disclosure relates to a technical field in displays, and particularly to a display panel and a display device.

BACKGROUND OF DISCLOSURE

In conventional display devices, such as smart phones, the fingerprint recognition sensors are typically disposed at a position of a home button. With development of full screens, borders around a display screen become narrower, and the home button is cancelled. The fingerprint recognition sensors on a back or a side of the mobile phone become an intermediate transitional solution. Disposing the sensors below or inside the display screen is a major developmental trend for the fingerprint recognition.

In conventional display devices, such as smart phones, the fingerprint recognition sensors are typically disposed below the display screen, and recognition is performed only in a predetermined area. The first defect is that the fingerprint module is disposed below the display screen, is apart from the display screen, and occupies space of the mobile phone module. Avoidance design is required for components, such as the battery, and a thickness of the module is thick. The second defect is that the recognition is only performed in the predetermined area. Moreover, a silicon-based complementary metal-oxide-semiconductor (CMOS) sensor is employed for the sensor. Costs of silicon as a substrate are high, and the CMOS manufacturing process is difficult, making full screen fingerprint recognition implementation difficult.

Therefore, there is a need to develop a novel display panel and a novel display device to solve the above technical problems.

SUMMARY OF INVENTION

Technical Problems

A primary object of the present disclosure is to provide a display panel and a display device. Display function, touch function, and fingerprint recognition function are integrated into one, by manufacturing fingerprint recognition units on a glass substrate on the display panel. The cost and the module thickness are further optimized. A fingerprint recognition area is realized as a full-screen area, and fingerprints can be recognized at any position on the screen. Furthermore, light transmission ports are defined in light shielding layers to constitute a collimator mechanism, thereby blocking large angle interfering light, realizing a high signal-to-noise ratio, and improving recognition precision of the fingerprint recognition units.

Technical Solutions

To resolve the above problems, an aspect of the present disclosure provides a display panel, including an array substrate, a liquid crystal layer, a color filter layer, a sensor layer, and a glass substrate. Specifically, the liquid crystal layer is disposed on the array substrate, the color filter layer is disposed on the liquid crystal layer, the sensor layer disposed on the color filter layer and includes a plurality of fingerprint recognition units, and a glass substrate disposed on the sensor layer.

In a further embodiment, the display panel further includes the collimator mechanism disposed on a side of the sensor layer away from the color filter layer.

In a further embodiment, the collimator mechanism includes an upper light shielding layer on a side of the glass substrate away from the sensor layer; and upper light transmission ports are defined at positions of the upper light shielding layer corresponding to the fingerprint recognition units.

In a further embodiment, the collimator mechanism includes a lower light shielding layer between the glass substrate and the sensor layer; and lower light transmission ports are defined at positions of the lower light shielding layer corresponding to the fingerprint recognition units.

In a further embodiment, a filter layer is disposed on a side of the fingerprint recognition units adjacent to the glass substrate.

In a further embodiment, the color filter layer includes a black matrix layer and pixel units disposed in a grid of the black matrix layer and passing through the black matrix layer; wherein the fingerprint recognition units are disposed at a side of the black matrix layer facing the glass substrate and located at intervals between the pixel units.

In a further embodiment, each of the pixel units includes three subpixels arranged side by side; and a length of the fingerprint recognition units is configured as an integer multiple of a side-by-side length of the three subpixels of the corresponding pixel units.

In a further embodiment, the display panel further includes a lower polarizer located on a side of the array substrate away from the glass substrate; and an upper polarizer located on a side of the glass substrate away from the array substrate.

In a further embodiment, each of the fingerprint recognitions unit includes a first electrode layer, a hole transport layer, a photosensitive layer, an electron transport layer, a second electrode layer, and a thin film transistor substrate. Specifically, the first electrode layer on the black matrix layer, the hole transport layer on the first electrode layer, the photosensitive layer on the hole transport layer, the electron transport layer on the photosensitive layer, the second electrode layer on the electron transport layer; the thin film transistor substrate on the second electrode layer, and the thin film transistor substrate is connected with the glass substrate.

An aspect of the present disclosure provides a display device including the aforementioned display panel.

Technical Effect

The display panel and the display device are provided in the present disclosure. The display function, the touch function, and the fingerprint recognition function are integrated into one, by manufacturing the fingerprint recognition units on the glass substrate on the display panel. The cost and the module thickness are further optimized. The fingerprint recognition area is realized as a full-screen area, and fingerprints can be recognized at any position on the screen. Furthermore, the light transmission ports are defined in the light shielding layers to constitute the collimator mechanism, thereby blocking the large angle interfering light, realizing the high signal-to-noise ratio, and improving the recognition precision of the fingerprint recognition units.

Figure 1:
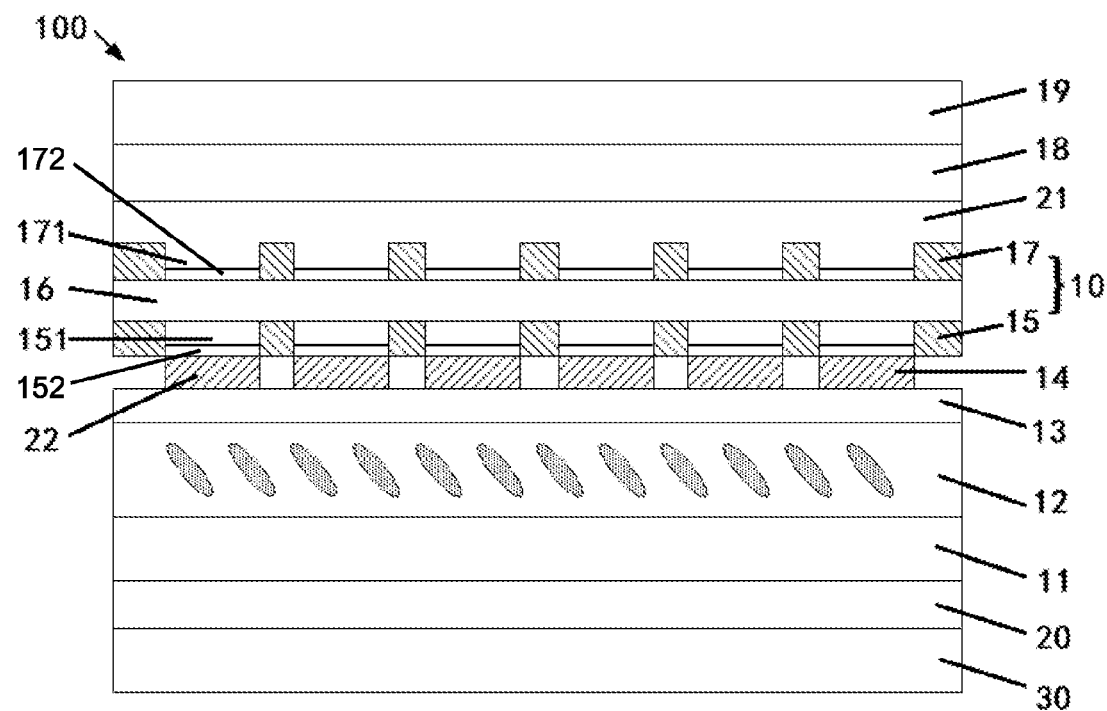
FIG. 1 is a schematic structural view of a display panel in accordance with an embodiment of the present disclosure.

The reference numerals are as follows:

10: collimator mechanism, 11: array substrate, 12: liquid crystal layer, 13: color filter layer, 14: sensor layer, 15: lower light shielding layer, 16: glass substrate, 17: upper light shielding layer, 18: optical adhesive layer, 19: protective layer, 20: lower polarizer, 21: upper polarizer, 22: fingerprint recognition units, 30: backlight, 41: fingerprint application specific integrated circuit (ASIC), 42: flexible circuit board, 43: touch with display driver integrated circuit, 100: display panel, 131: black matrix layer, 132: pixel units, 151: lower light transmission ports, 152, 172: filter layer, 171: upper light transmission port, 221: first electrode layer, 222: hole transport layer, 223: photosensitive layer, 224: electron transport layer, 225: second electrode layer, 226: thin film transistor substrate, 1311: first black matrix strip, 1312: second black matrix strip, 1321: red subpixels, 1322: green subpixels, 1323: blue subpixels

DETAILED DESCRIPTION OF PREFERRED EMBODIMENTS

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Terms of elements mentioned in the embodiments, such as "the first", "the second", etc., are only used to distinguish different elements for clear expression and understanding, and should not be construed as limiting technical solutions of the present disclosure. In the drawings, elements or components having the same or similar structures are denoted by the same reference numerals.

The embodiments of the present disclosure are described in detail herein with reference to the drawings. The present disclosure may be embodied in many different forms, and the present disclosure is not to be construed as being limited to the specific embodiments set forth herein. The present disclosure provides the embodiments to explain the practical applications of the present disclosure, so that those skilled in the art can understand the technical solutions of the present disclosure and various modifications suitable for the specific intended application.

In the present disclosure, it is noted that, unless otherwise explicitly set forth and defined, the terms "mount", "contact", and "connect" should be understood broadly, and, for example, may be fixedly connected, detachably connected, integrally connected, mechanically connected, electrically connected, directly connected, or indirectly connected through an intermediate medium, or internally communicated within two components. For those of ordinary skill in the art, the specific meaning of these terms in the present disclosure should be understood on a basis of a specific case situation.

As shown in FIG. 1, in an embodiment of the present disclosure, a display panel 100 is provided and includes an array substrate 11, a liquid crystal layer 12, a color filter layer 13, a sensor layer 14, and a glass substrate 16. Specifically, the liquid crystal layer 12 is disposed on the array substrate 11, the color filter layer 13 is disposed on the liquid crystal layer 12, the sensor layer 14 is located on the color filter layer 13, the sensor layer 14 includes a plurality of fingerprint recognition units 22, and the glass substrate 16 is located on the sensor layer 14.

As shown in FIG. 1, the display panel further includes a collimator mechanism 10, and the collimator mechanism 10 is disposed on the sensor layer 14, that is, on a side of the sensor layer 14 away from the color filter layer 13. The fingerprint recognition units 22 include optical fingerprint sensors.

As shown in FIG. 1, the collimator mechanism 10 includes an upper light shielding layer 17 on the glass substrate 16, that is, on a side of the glass substrate 16 away from the sensor layer 14. Upper light transmission ports 171 are defined at positions of the upper light shielding layer 17 corresponding to the fingerprint recognition units 22. The upper light transmission ports 171 constitute a plurality of collimators.

The collimator mechanism 10 includes a lower light shielding layer 15 between the glass substrate 16 and the sensor layer 14. Lower light transmission ports 151 are defined at positions of the lower light shielding layer 15 corresponding to the fingerprint recognition units 22. There is a lower light transmission port 151. The lower light transmission ports 151 correspondingly constitute a plurality of collimators.

If the collimator mechanism 10 includes the upper light shielding layer 17 and the lower light shielding layer 15, the lower light transmission ports 151 are disposed in one-to-one correspondence with the upper light transmission ports 171, and the upper light transmission ports 171 and the lower light transmission ports 151 together constitute the collimators of the fingerprint recognition units 22. The collimators formed by the upper light shielding layer 17 and the lower light shielding layer 15 are able to further filter light, so that effective light in a small angular range out of the light originally distributed in a large angular range is emitted onto a photosensitive element, further realizing a high signal-to-noise ratio by blocking large angle interfering light, thereby avoiding mechanical interference, reducing interference between adjacent pixel units, and improving fingerprint recognition precision and image formation quality.

Moreover, the lower light shielding layer 15 and the upper light shielding layer 17 are made of material with an extreme low light transmittance, such that the light can pass through the lower light transmission ports 151 and the upper light transmission ports 171, but the portions other than the lower light transmission ports 151 and the upper light transmission ports 171 block light transmission or absorb the large angular noise light, thereby reducing crosstalk between the different optical collimators.

As shown in FIG. 1, in the display panel 100 in accordance with an embodiment of the present disclosure, the display function, the touch function, and the fingerprint recognition function are integrated into one, by integrating the fingerprint recognition units 22 into the display panel 100. The cost and the module thickness are further optimized. The fingerprint recognition area is realized as a full-screen area, and fingerprints can be recognized at any position on the screen. Furthermore, the light transmission ports (the lower light transmission ports 151 and the light transmission ports 171 in the embodiment as shown in FIG. 1) are defined in the light shielding layers (the lower light shielding layer 15 and the upper light shielding layer 17 in the embodiment shown in FIG. 1) to constitute the plurality of collimators, so that the effective light in the small angular range out of the light originally distributed in the large angular range is emitted onto the photosensitive element, further realizing the high signal-to-noise ratio by blocking the large angle interfering light, thereby avoiding the mechanical interference, reducing the interference between adjacent pixel units, and improving the recognition precision of the fingerprint recognition units 22.

As shown in FIG. 1, in the embodiment, a filter layer 152 is further disposed on a side of the fingerprint recognition units 22 facing the glass substrate 16. A shape and A size of the filter layer 152 match those of the fingerprint recognition units 22. Preferably, the filter layer 152 is disposed at positions of the lower light transmission ports 151, that is, in the same layer as the lower light shielding layer 15. Certainly, the filter layer (including 152, 172) may be individually or collaboratively disposed at the upper light transmission ports 171, that is, in the same layer as the upper light shielding layer 17. Material of the filter layer 152, 172 includes photoresist material, and ingredients of the material include a pigment, a photocurable resin, an alkali-soluble resin, a photoinitiator, and the like. The filter layer 152, 172 precisely allows the light in a certain wavelength range to pass, and reflects the light in other wavelengths which are not desired, to selectively only provide the light in the same color (or the same wavelength) for photodiodes (PD) in the pixels of the fingerprint recognition units 22, thereby improving sharpness of fingerprint sensing results of the fingerprint recognition units 22. This is because the photosensitive elements are sensitive to the light in a certain wavelength range. That is, the wavelength quantum efficiency (EQE) of the photodiodes (PD) in this wavelength range is high, so that the disposed filter layer 152, 172 filters out the light in the wavelength range to which the photosensitive elements are insensitive, and leaves only the light to which the photosensitive elements are sensitive, to reach the photosensitive elements, thereby improving the sharpness of the fingerprint recognition sensing.

Figure 2:
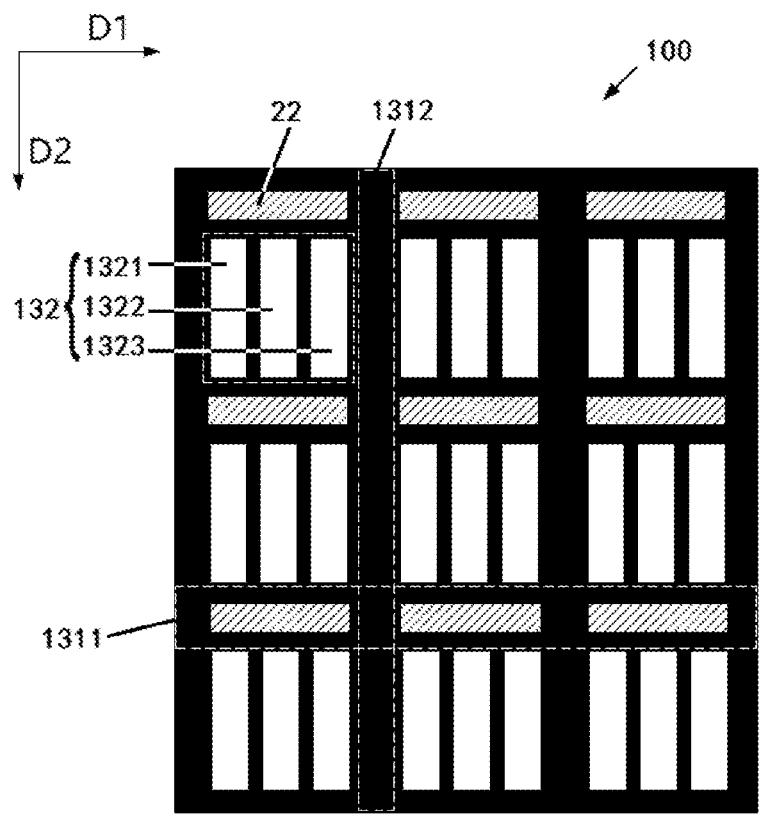
FIG. 2 is a schematic planar view of a planar structure of a display panel illustrating a positional relationship between a color film layer and fingerprint recognition units in accordance with an embodiment of the present disclosure.
Figure 3:
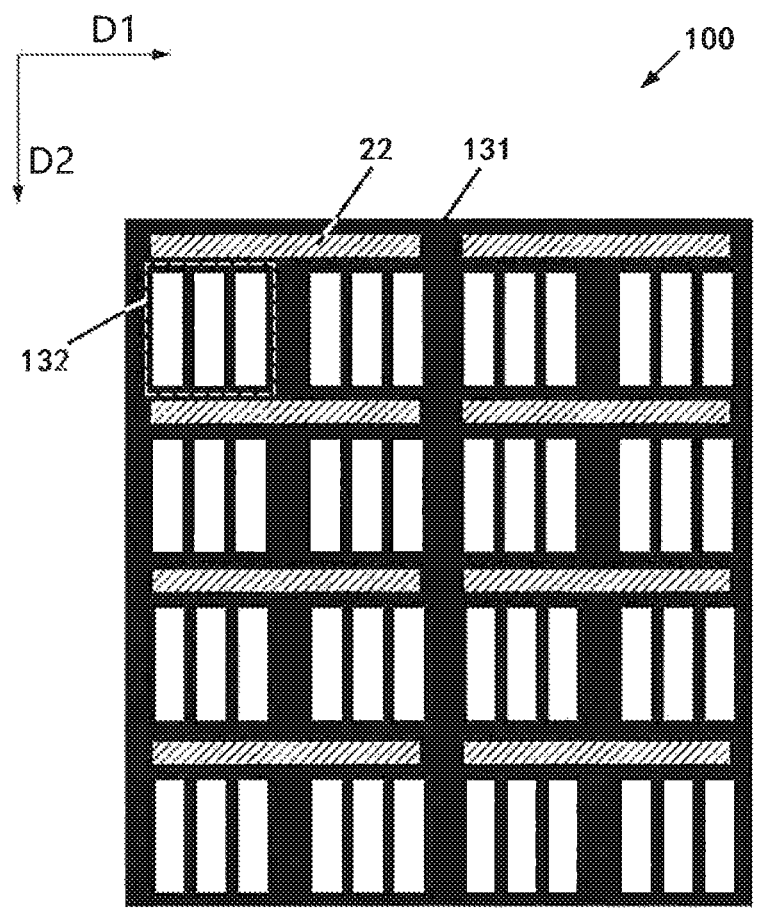
FIG. 3 is a schematic planar view of a display panel in accordance with another embodiment of the present disclosure.

As shown in FIG. 2 and FIG. 3, in the embodiment, the color filter layer 13 includes a black matrix layer 131 and pixel units 132 disposed in a grid of the black matrix layer 131 and passing through the black matrix layer 131. The fingerprint recognition units 22 are disposed at a side of the black matrix layer 131 facing the glass substrate 16 and located at intervals between the pixel units 132.

As shown in FIG. 2 and FIG. 3, in the embodiment, each of the pixel units 132 includes three subpixels arranged side by side, such as red subpixels 1321, green subpixels 1322, and blue subpixels 1323. The three subpixels are arranged side by side to form the pixel units 132.

As shown in FIG. 2 and FIG. 3, the display panel 100 is formed with the plurality of pixel units 132. The pixel units 132 are arranged in an array, and the black matrix layer 131 is distributed between the pixel units 132. Specifically, a first black matrix strip 1311 along a first direction D1 and a second black matrix strip 1312 along a second direction D2 are disposed between the pixel units 132. The first black matrix strip 1311 along the first direction D1 is disposed to intersect the second black matrix strips 1312 along the second direction D2, wherein the first direction D1 is a direction in which the subpixels of the pixel units 132 are arranged side-by-side, and the second direction D2 is a direction in which the subpixels of the pixel units 132 extend. In other words, the first direction D1 is perpendicular to the direction in which the subpixels of the pixel units 132 extend, and the second direction D2 is parallel to the direction in which the subpixels of the pixel units 132 extend.

The first black matrix strip 1311 along the first direction D1 and the second black matrix strips 1312 along the second direction D2 collaboratively form the black matrix layer 131. A width of the first black matrix strip 1311 along the first direction D1 is greater than a width of the second black matrix strip 1312 along the second direction D2, Therefore, in an embodiment of the present disclosure, the fingerprint recognition units 22 are preferably disposed on the first black matrix strip 1311 along the first direction D1, thereby increasing a aperture ratio of the display panel 100.

It should be understood that in other embodiments, the fingerprint recognition units 22 may also be disposed on both the first black matrix strip 1311 along the first direction D1 and the second black matrix strip 1312 along the second direction D2, thereby increasing the number of the arranged fingerprint recognition units 22, and improving the sensitivity of the fingerprint recognition.

As shown in FIG. 2 and FIG. 3, in the embodiment, the fingerprint recognition units 22 are equally spaced apart. A length of the fingerprint recognition units 22 is configured as an integer multiple of a side-by-side length of the three subpixels 1321, 1322, 1323 of the corresponding pixel units 132. The integer multiple may be 1, 2, 3, and so on. As shown in FIG. 2, the length of the fingerprint recognition units 22 is preferably one time as long as the total side-to-side length of the three subpixels 1321, 1322, and 1323 of the pixel unit 132. That is, the two lengths are equal. As shown in FIG. 3, the length of the fingerprint recognition units 22 is preferably be twice as long as the total side-to-side length of the three subpixels 1321, 1322, 1323 of the pixel unit 132. It should be understood that the length of the fingerprint recognition units 22 may be adjusted based upon actual use requirements, and even the fingerprint recognition units 22 may be connected with each other to constitute a grid form, as long as the fingerprint recognition function is achieved.

As shown in FIG. 1, in the embodiment, the display panel 100 further includes a lower polarizer 20 and an upper polarizer 21 disposed opposite to each other. Specifically, the lower polarizer 20 is located on a side of the array substrate 11 away from the glass substrate 16, and the upper polarizer 21 is located on a side of the glass substrate 16 away from the array substrate 11.

As shown in FIG. 1, in the embodiment, the glass substrate 16 further includes an optical adhesive layer 18 and a protective layer 19. Specifically, the optical adhesive layer 18 is located on the glass substrate 16, and the protective layer 19 is located on the optical adhesive layer 18.

As shown in FIG. 1, in the embodiment, the display panel 100 further includes a backlight 30 located on a side of the array substrate 11 away from the glass substrate 16. A min-light emitting diode (Mini LED) surface light source is preferably adopted as the backlight 30, which can improve uniformity of the light, and solve the backlight uniformity problem of the fingerprint recognition units 22, thereby improving the imaging quality of the fingerprint recognition units 22, unifying gray scales of acquired fingerprint images, raising light source utilization rate, and lowering energy consumption. The backlight 30 may also be in other structural forms, as long as the backlight functions as a surface light source to improve the light uniformity. Those backlights are all within the scope of the present disclosure.

In use, when the finger touches the display panel 100, light emitted by the backlight 30 passes through the layers of the display to reach the finger of the user. Due to a difference in light intensity reflected by the ridges and valleys of the finger, there is a difference in the light intensity reaching the fingerprint recognition units 22 and received by the fingerprint recognition units 22. Thereby, the different light intensities are transformed into different electrical signals to finally realize the fingerprint recognition. The collimator mechanism 10 is configured to collect the light reflected by the fingerprint, separate the light from the different positions on the top, and narrow or focus the light reflected from the finger onto the fingerprint photosensitive element. Each of the collimators of the collimator mechanism 10 is configured to perform spatial filtering by transmitting the light in a direction along or near an axis of the collimator mechanism 10 while blocking the light in other directions. Moreover, the effective light in the small angular range out of the light originally distributed in the large angular range is emitted onto the photosensitive element, thereby preventing the light from interference and reducing the interference between the adjacent pixel units.

Figure 4:
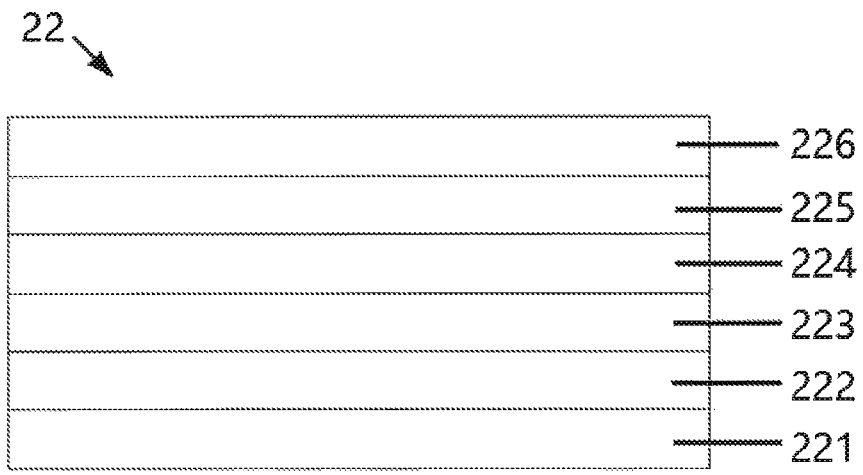
FIG. 4 is a schematic structural view of fingerprint recognition units in accordance with an embodiment of the present disclosure.

As shown in FIG. 4, in one embodiment, the fingerprint recognition units 22 include a first electrode layer 221, a hole transport layer 222, a photosensitive layer 223, an electron transport layer 224, a second electrode layer 225, and a thin film transistor substrate 226 disposed in a stack. Specifically, the first electrode layer 221 is located on the black matrix layer 131. The hole transport layer 222 is located on the first electrode layer 221, and the photosensitive layer 223 is located in the hole transport layer 222. The electron transport layer 224 is located on the photosensitive layer 223, the second electrode layer 225 is located on the electron transport layer 224, the thin film transistor substrate 226 is located on the second electrode layer 225, The thin film transistor substrate 226 is connected with the glass substrate 16.

In a present disclosure, a display device is provided, and includes the display panel 100 described above.

In the display device of the present disclosure, the display function, the touch function, and the fingerprint recognition function are specifically integrated into one on the glass substrate 16 of the display panel 100, by integrating the fingerprint recognition units 22 into the display panel 100. The cost and the module thickness are further optimized. The fingerprint recognition area is realized as a full-screen area, and fingerprints can be recognized at any position on the screen. Furthermore, the light transmission ports (the lower light transmission ports 151 and the light transmission ports 171 in the embodiment as shown in FIG. 1) are defined in the light shielding layers (the lower light shielding layer 15 and the upper light shielding layer 17 in the embodiment shown in FIG. 1) to constitute the plurality of collimators, so that the effective light in the small angular range out of the light originally distributed in the large angular range is emitted onto the photosensitive element, further realizing the high signal-to-noise ratio by blocking the large angle interfering light, thereby avoiding the mechanical interference, reducing the interference between adjacent pixel units, and improving the recognition precision of the fingerprint recognition units 22.

The display device in the embodiment of the present disclosure may be any product or component having a display function, such as a mobile phone, a tablet, a television, a display, a laptop, a digital photo frame, a navigator, and the like.

Figure 5:
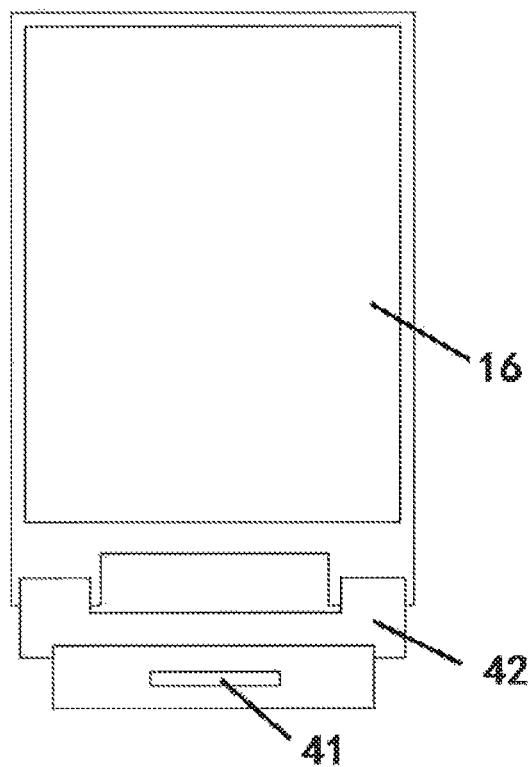
FIG. 5 is a schematic view of side binding of a glass substrate in accordance with an embodiment of the present disclosure.
Figure 6:
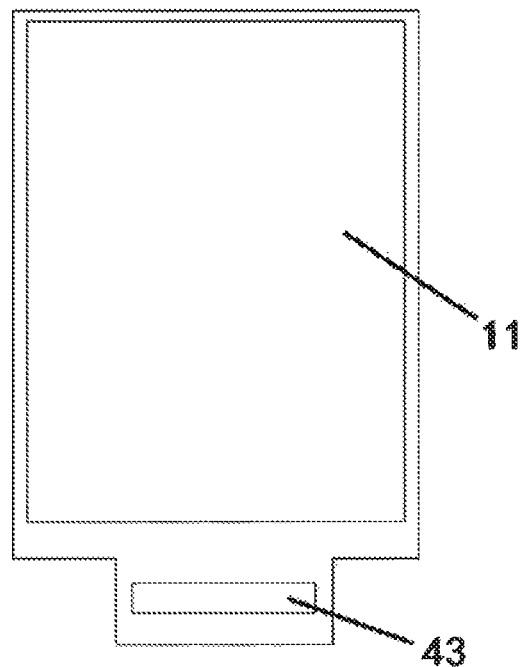
FIG. 6 is a schematic view of side binding of an array substrate in accordance with an embodiment of the present disclosure.

FIG. 5 and FIG. 6 are the schematic diagrams illustrating side binding of the display device. As shown in FIG. 5, a fingerprint application specific integrated circuit 41 (ASIC) of the glass substrate 16 is bonded by means of a chip on the flexible circuit board 42 (chip on flex, COF). As shown in FIG. 6, a touch with display driver integrated circuit 43 (TDDI IC) of the array substrate 11 is bonded by means of a chip on a glass (referring to the array substrate 11) (COG) or a chip on a flexible circuit board (COF) (only COG is shown in the figure), so that the bottom bezel border need not be widened.

Advantages of the present disclosure are as follows: The display panel and the display device are provided in the present disclosure. The display function, the touch function, and the fingerprint recognition function are integrated into one, by manufacturing the fingerprint recognition units on the glass substrate on the display panel. The cost and the module thickness are further optimized. The fingerprint recognition area is realized as a full-screen area, and fingerprints can be recognized at any position on the screen. Furthermore, the light transmission ports are defined in the light shielding layers to constitute the plurality of collimators, so that the effective light in the small angular range out of the light originally distributed in the large angular range is emitted onto the photosensitive element, further realizing the high signal-to-noise ratio by blocking the large angle interfering light, thereby avoiding the mechanical interference, reducing the interference between adjacent pixel units, and improving the recognition precision of the fingerprint recognition units.

The above description only shows preferred embodiments of the present disclosure, and it should be noted that those skilled in the art may also make several improvements and refinements without departing from the principles of the present disclosure. These improvements and refinements should also be considered to be within the scope of the present disclosure.

What is claimed is:

1. A display panel comprising:
   an array substrate;
   a liquid crystal layer disposed on the array substrate;
   a color filter layer disposed on the liquid crystal layer;
   a sensor layer disposed on the color filter layer and including a plurality of fingerprint recognition units;
   a glass substrate disposed on the sensor layer; and
   a collimator mechanism disposed on a side of the sensor layer away from the color filter layer,
   wherein the collimator mechanism includes an upper light shielding layer on a side of the glass substrate away from the sensor layer; and upper light transmission ports are defined at positions of the upper light shielding layer corresponding to the fingerprint recognition units;
   the collimator mechanism includes a lower light shielding layer between the glass substrate and the sensor layer; and lower light transmission ports are defined at positions of the lower light shielding layer corresponding to the fingerprint recognition units; and
   one of two filter layers is disposed on a side of the fingerprint recognition units adjacent to the glass substrate, and another one of the two filter layers is disposed at the upper light transmission ports.

2. The display panel as claimed in claim 1, wherein the color filter layer includes a black matrix layer and pixel units disposed in a grid of the black matrix layer and passing through the black matrix layer; wherein the fingerprint recognition units are disposed at a side of the black matrix layer facing the glass substrate and located at intervals between the pixel units.

3. The display panel as claimed in claim 1, wherein
each of the pixel units includes three subpixels arranged side by side; and
a length of the fingerprint recognition units is configured as an integer multiple of a side-by-side length of the three subpixels of the corresponding pixel units.

4. The display panel as claimed in claim 1, further including:
a lower polarizer located on a side of the array substrate away from the glass substrate; and
an upper polarizer located on a side of the glass substrate away from the array substrate.

5. The display panel as claimed in claim 1, wherein each of the fingerprint recognitions unit includes:
a first electrode layer on the black matrix layer;
a hole transport layer on the first electrode layer;
a photosensitive layer on the hole transport layer;
an electron transport layer on the photosensitive layer;
a second electrode layer on the electron transport layer; and
a thin film transistor substrate on the second electrode layer.

6. A display device comprising the display panel as claimed in claim 1.

* * * * *